US006618517B2

(12) United States Patent
Ducellier et al.

(10) Patent No.: US 6,618,517 B2
(45) Date of Patent: Sep. 9, 2003

(54) CASCADABLE LARGE OPTICAL CROSS-CONNECT

(75) Inventors: Thomas Ducellier, Ottawa (CA); Robert Ian MacDonald, Ottawa (CA)

(73) Assignee: JDS Uniphase Inc., Ottawa (CA)

( * ) Notice: Subject to any disclaimer, the term of this patent is extended or adjusted under 35 U.S.C. 154(b) by 0 days.

(21) Appl. No.: 09/983,865

(22) Filed: Oct. 26, 2001

(65) Prior Publication Data

US 2002/0061157 A1 May 23, 2002

(30) Foreign Application Priority Data

Nov. 20, 2000 (CA) .............................. 2326362
Dec. 6, 2000 (CA) .............................. 2327862

(51) Int. Cl.[7] .............................. G02B 6/26; G02B 6/42
(52) U.S. Cl. .............................. 385/17; 385/18
(58) Field of Search .............................. 385/17, 18, 15, 385/16, 24

(56) References Cited

U.S. PATENT DOCUMENTS

| 5,524,153 A | | 6/1996 | Laor .............................. 385/16 |
| 5,903,687 A | * | 5/1999 | Young et al. .................. 385/17 |
| 5,914,801 A | | 6/1999 | Dhuler et al. ................. 359/230 |
| 6,002,818 A | | 12/1999 | Fatehi et al. ................... 385/17 |
| 6,005,993 A | | 12/1999 | MacDonald .................. 385/16 |
| 6,005,998 A | | 12/1999 | Lee .............................. 385/33 |
| 6,087,747 A | | 7/2000 | Dhuler et al. ................. 310/90 |
| 6,097,858 A | | 8/2000 | Laor .............................. 385/16 |
| 6,097,859 A | | 8/2000 | Solgaard et al. ............. 385/17 |
| 6,097,860 A | | 8/2000 | Laor .............................. 385/17 |
| 6,101,299 A | | 8/2000 | Laor .............................. 385/16 |
| 6,134,042 A | | 10/2000 | Dhuler et al. ................. 359/224 |
| 6,160,928 A | * | 12/2000 | Schroeder ..................... 385/18 |
| 6,253,001 B1 | | 6/2001 | Hoen .......................... 385/17 |
| 6,289,145 B1 | | 9/2001 | Solgaard et al. ............. 385/17 |
| 6,317,530 B1 | * | 11/2001 | Ford .............................. 385/17 |
| 6,330,102 B1 | * | 12/2001 | Daneman et al. ........... 359/290 |
| 6,347,167 B1 | * | 2/2002 | Hagelin ....................... 385/18 |
| 6,374,009 B1 | * | 4/2002 | Chang et al. ................. 385/18 |
| 6,396,973 B1 | * | 5/2002 | Hagelin et al. ............... 385/17 |
| 6,430,330 B1 | * | 8/2002 | Hagelin ....................... 385/17 |
| 6,487,334 B2 | * | 11/2002 | Ducellier et al. ............. 385/22 |
| 2002/0061158 A1 | * | 5/2002 | Ducellier ..................... 385/17 |

FOREIGN PATENT DOCUMENTS

WO    WO 99/66354    12/1999

* cited by examiner

Primary Examiner—Robert H. Kim
Assistant Examiner—Thomas R Artman
(74) Attorney, Agent, or Firm—Neil Teitelbaum (57) ABSTRACT

A high capacity cross-connect in which a 3D switch core includes express paths that facilitate cascading of cross-connect blocks. A light beam propagates from an input waveguide 18 to a first MEMS mirror, which deflects the light beam to either an express optical path or a switching optical path. In the express optical path, the light beam propagates from the first MEMS mirror to a predetermined output waveguide, which is determined by the design of the switch core. In the switching optical path, the light beam propagates from the first MEMS mirror to a second MEMS mirror, which deflects the light beam to a selected one of a set of two or more output waveguides associated with the second MEMS mirror.

24 Claims, 6 Drawing Sheets

CASCADABLE LARGE OPTICAL CROSS-CONNECT

CROSS-REFERENCE TO RELATED APPLICATIONS

This application is based on, and claims priority of, Canadian Patent Applications Nos. 2,326,362 filed Nov. 20, 2000, and 2,327,862 filed Dec. 6, 2000.

MICROFICHE APPENDIX

Not Applicable.

TECHNICAL FIELD

The present application relates to the field of optical cross-connects, and in particular to a cascadable optical cross-connect.

BACKGROUND OF THE INVENTION

Optical matrix cross-connects (or switches) are commonly used in communications systems for transmitting voice, video and data signals. Generally, optical matrix cross-connects include multiple input and/or output ports and have the ability to connect, for purposes of signal transfer, any input port/output port combination, and preferably, for N×M switching applications, to allow for multiple connections at one time. At each port, optical signals are transmitted and/or received via an end of an optical waveguide. The waveguide ends of the input and output ports are optically connected across a switch core. In this regard, for example, the input and output waveguide ends can be physically located on opposite sides of a switch core for direct or folded optical pathway communication therebetween, in side-by-side matrices on the same physical side of a switch core facing a mirror, or they may be interspersed in a single matrix arrangement facing a mirror.

Establishing a connection between any input port and a selected output port involves configuring an optical pathway across the switch core. One known way to configure the optical pathway is by moving or bending optical fibers using, for example, piezoelectric actuators. The actuators operate to displace the fiber ends so that signals from the fibers are targeted at one another so as to form the desired optical connection across the switch core. The amount of movement is controlled based on the electrical signal applied to the benders. By appropriate arrangement of actuators, two-dimensional targeting control can be effected.

Another way of configuring the optical path between an input port and an output port involves the use of one or more movable mirrors interposed between the input and output ports. In this case, the waveguide ends remain stationary and the mirrors are used to deflect a light beam propagating through the switch core from the input port to effect the desired switching. Micro-electro-mechanical mirrors known in the art can allow for two-dimensional targeting to optically connect any input port to any output port. For example, U.S. Pat. No. 5,914,801, entitled MICROELECTROMECHANICAL DEVICES INCLUDING ROTATING PLATES AND RELATED METHODS, which issued to Dhuler et al on Jun. 22, 1999; U.S. Pat. No. 6,087,747, entitled MICROELECTROMECHANICAL BEAM FOR ALLOWING A PLATE TO ROTATE IN RELATION TO A FRAME IN A MICROELECTROMECHANICAL DEVICE, which issued to Dhuler et al on Jul. 11, 2000; and U.S. Pat. No. 6,134,042, entitled REFLECTIVE MEMS ACTUATOR WITH A LASER, which issued to Dhuler et al on Oct. 17, 2000, disclose micro-electro-mechanical mirrors that can be controllably moved in two dimensions to effect optical switching. U.S. Pat. No. 6,097,858, entitled SENSING CONFIGURATION FOR FIBER OPTIC SWITCH CONTROL SYSTEM, and U.S. Pat. No. 6,097,860, entitled COMPACT OPTICAL MATRIX SWITCH WITH FIXED LOCATION FIBERS, both of which issued to Laor on Aug. 1, 2000, disclose switch control systems for controlling the position of two-dimensionally movable mirrors in an optical switch.

An important consideration in cross-connect design is minimizing physical size for a given number of input and output ports that are serviced, i.e., increasing the packing density of ports and beam directing units. It has been recognized that greater packing density can be achieved, particularly in the case of a movable mirror-based beam directing unit, by folding the optical path between the ports and the movable mirror and/or between the movable mirror and the switch interface. Such a compact optical matrix switch is disclosed in U.S. Pat. No. 6,097,860. In addition, further compactness advantages are achieved therein by positioning control signal sources outside of the fiber array and, preferably, at positions within the folded optical path selected to reduce the required size of the optics path.

Another technique of minimizing cross-connect size is to minimize the number of mirrors within the switch core. For example, a typical two-dimensional (2D) switch core employs a matrix of $N^2$ independently movable mirrors, which enable N×N switching using a single reflection of a light beam propagating between an input port and a selected output port. However, since each of the $N^2$ mirrors must be independently controlled, increases in the size of the switch core (that is, increasing N) implies an exponential increase in the number of mirrors, and a corresponding increase in the size of the switch control circuitry. These factors combine to impose practical limits on the size of the cross-connect. One way of overcoming this problem, and thereby enabling the construction of high capacity cross-connects, is to employ a three-dimensional (3D) switch core, in which 2N independently movable mirrors are used to enable N×N switching. Within a 3D switch core, optical switching is performed using two reflections of the light beam propagating between an input port and a selected output port. The reduced number of mirrors required by a 3D switching core (2N as compared to $N^2$ required by a 2D switching core) is beneficial in that it permits the construction of a physically smaller switch core. Additionally, it permits a corresponding reduction in the size of the switch control system, and therefore enables construction of higher capacity cross-connects.

While it is desirable to minimize the physical size of the cross-connect, a competing demand is to maximize the number of fibers (or waveguides) between which signals can be switched. In electronic switching technologies, this is commonly accomplished by connecting a plurality of cross-connect blocks together to form a network having a larger capacity. As is known in the art, a fully non-blocking M×M cross-connect can be created using a plurality of smaller (that is, lower capacity) N×N cross-connect blocks interconnected to define a 3-layer Clos network.

Implementation of Clos network architectures in the optical domain requires that cross-connect blocks be cascaded. This, in turn, requires that each block be capable of N×2N switching. As is well known in the art, N×2N optical switching can be accomplished using a conventional 2D N×2N switch core, in which 2N mirrors are positioned within a propagation path of an input light beam to selectively switch the light beam to a respective one of 2N output ports. An analogous technique uses a switch core composed of a MEMS array having N independently positionable mirrors, each of which is designed to switch a respective incident light beam to a selected one of 2N output ports. Both of these approaches suffer from scalability limitations, as even small increases in the value of N result in sizable increases in either the number of mirrors (and thus the size of the switch core) or the number of positions to which each mirror must be positioned (and thus the complexity of the control system).

An alternative technique of implementing N×2N switching is to provide the switch core with express paths that couple inbound optical signals directly to an express output port (typically connected to an input port of an adjacent switch block) effectively bypassing the switch core. Such express paths can readily be implemented in a conventional 2D N×N switch core, by positioning a respective express output port on the opposite side of the switch core from each input port. With this arrangement, when all of the N mirrors associated with any one input port are positioned out of the propagation path, the light beam from the input port will transit the switch core to the respective express output port unhindered. However, in a 3D switch core, no such direct paths through the switch core exist. Consequently, cross-connect blocks incorporating 3D switch cores cannot be cascaded, and thus are not utilized in large switch networks.

Accordingly, a high capacity optical cross-connect, which can be readily cascaded remains highly desirable.

SUMMARY OF THE INVENTION

Accordingly, an object of the present invention is to provide a high capacity cascadable optical cross-connect.

Thus an aspect of the present invention provides a cascadable optical cross-connect including a pair of optical arrays and a plurality of optical bypasses. Each optical array includes a respective plurality of mirrors. Each optical bypass is disposed within a respective optical array, and is adapted to permit a light beam to pass through the respective optical array between a respective waveguide and a respective mirror of the opposite optical array. The mirrors are moveable to selectively define a propagation path of a light beam through the optical cross-connect via any two optical bypasses.

Preferably, at least one optical bypass is disposed within one optical array, and at least two optical bypasses are disposed within the opposite optical array. Each optical bypass may be provided as any one of: an optically transparent region of the respective optical array; and an opening defining a passage through the respective optical array.

Each optical bypass may also include means for deflecting light beams propagating through the optical bypass. In such cases, the deflecting means may be provided as any one or more of: a lens; a prism; and a mirror. This arrangement enables the optical bypasses to be located close to one another, thereby facilitating a compact switch core. As light beams propagate through the optical bypass, they are deflected to an area of the cross-connect in which there is sufficient space to permit installation of waveguides to conduct the light beams away from the cross-connect.

Each optical bypass may be associated with a respective plurality of waveguides. In such cases, the optical bypass is preferably adapted to permit respective light beams to pass through the respective optical array between each one of the associated plurality of waveguides and the opposite optical array. Each optical bypass may include means for directing respective propagation paths of the light beams to converge as they pass through the optical bypass. The means for directing the propagation paths of the light beams may include a respective relay lens disposed between the optical bypass and the associated waveguides. In this case, the relay lens preferably has a focal point disposed within the optical bypass. Alternatively, the associated waveguides may be radially disposed about an optical axis of the optical bypass, such that light beams emerging from each waveguide converge as they pass through the optical bypass.

In some embodiments, a number of mirrors of one optical array is equal to a number of waveguides associated with each optical bypass of the opposite optical array. Each mirror of one optical array preferably lies in a propagation path from a respective one waveguide associated with each optical bypass of the opposite optical array. Thus each mirror can deflect a light beam to (or, equivalently, receive a light beam from) any one of a set of waveguides composed of one waveguide associated with each optical bypass of the opposite optical array.

In some embodiments, each one of the plurality of mirrors of each optical array includes a respective default position defining a propagation path between a selected pair of optical bypasses of the opposite optical array. Preferably, each mirror automatically moves to the respective default position in an event of a failure of the optical cross-connect. By this means, when a failure of the optical cross-connect occurs, light beams entering the optical cross-connect can be directed out of the cross-connect, for example to a protection cross-connect.

In some embodiments, each optical array further comprises an axis of symmetry. In such cases, at least the respective plurality of mirrors may be symmetrically disposed about the axis of symmetry. One of the optical bypasses of each optical array may be disposed on the respective axis of symmetry of the optical array. The axes of symmetry of each of the optical arrays are preferably co-extensive.

In some embodiments, a lens is disposed between the pair of opposed optical arrays. Preferably, the opposed optical arrays are oriented to lie in respective opposed focal planes of the lens. Still more preferably, at least one optical bypass of each optical array is disposed on an optical axis of the lens, and the respective plurality of mirrors of each optical array are symmetrically disposed about an optical axis of the lens.

Thus the present invention provides a high capacity cross-connect in which a 3D switch core includes multiple optical bypasses providing corresponding multiple propagation paths through the switch core to facilitate cascading of cross-connect blocks. A light beam propagating in a waveguide enters the switch core through an optical bypass through a first optical array and propagates to a mirror of a second optical array (opposite the first optical array). The mirror can deflect the light beam to either an express optical path or a switching optical path. In the express optical path, the light beam propagates from the mirror to a waveguide associated with another optical bypass of the first optical array. In the switching optical path, the light beam propagates from the mirror to a selected mirror of the first optical array, which deflects the light beam to a waveguide associated with a selected optical bypass of the second optical array.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
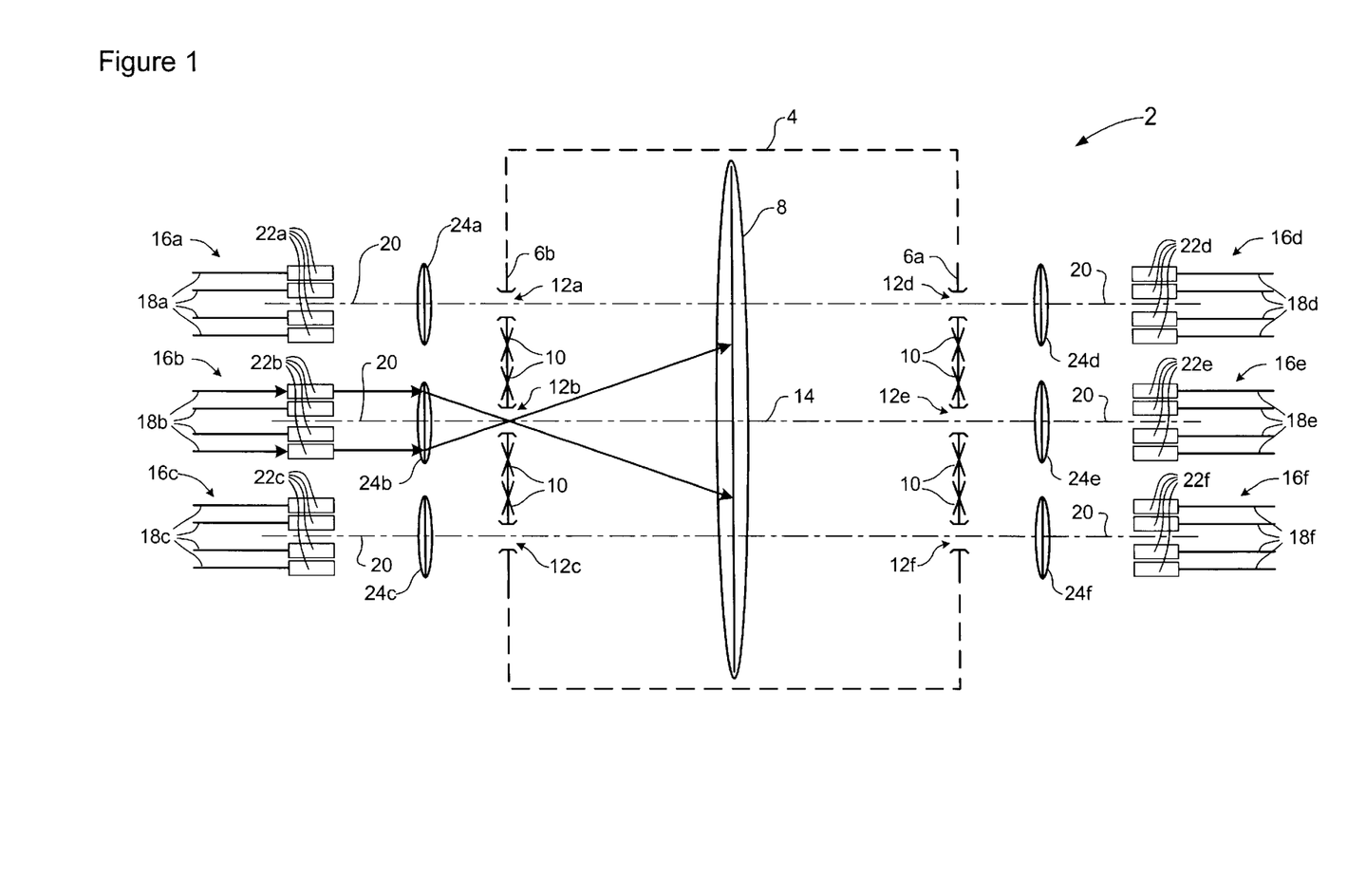
FIG. 1 is a block diagram schematically illustrating principle elements of a cross-connect in accordance with an embodiment of the present invention.

The present invention provides a high capacity cross-connect in which a 3D switch core includes multiple optical paths that facilitate cascading of cross-connect blocks. FIG. 1 illustrates an exemplary large optical cross-connect arrangement in accordance with a first embodiment of the present invention.

As shown in FIG. 1, the optical cross-connect 2 comprises a switch core 4 defined by a pair of opposed optical arrays 6 symmetrically arranged on opposite sides of an Angle-To-Offset (ATO) lens 8. The ATO lens 8 operates to deflect the propagation path of light beams within the switch core 4. For the purposes of the present invention, an ATO lens 8 may be provided as any suitable optical element having optical power, and a focal length that corresponds to the near zone length [multi mode] or Rayleigh range [single mode] of the optical beams within the switch core 4. This minimizes the beam size requirement because the beam size on the two focal planes is equal, thus enabling a compact switch.

Each array 6 includes a plurality of optical elements defining N Micro-Electro-Mechanical Switch (MEMS) mirrors 10 (N=4 in the illustrated embodiment), and at least one optical bypass 12 through which light beams may enter (and/or exit) the switch core 4. In order to enable provisioning of express paths through the switch core, one of the arrays 6 must be provided with two (or more) bypasses 12. In the illustrated embodiment, each array 6 includes three optical bypasses 12, although it will be appreciated that more, or fewer bypasses may be provided in each array 6. The optical arrays 6 are preferably positioned to lie in respective opposite focal planes of the ATO lens 8. As may be seen in FIG. 1, each optical array 6 has an axis of symmetry 14 that is co-extensive with an optical axis of the ATO lens 8.

Each MEMS mirror 10 is preferably provided as a two-dimensionally tiltable micro-mirror which can be selectively oriented, in a manner known in the art, to deflect a light beam received from any optical element 10,12 of the opposite array 6 to any other optical element 10,12 of the opposite array 6. Thus each MEMS mirror 10 can be selectively positioned to define a propagation path between any two optical elements 10,12 of the opposite optical array 6. As will be described in greater detail below, this positioning capability of each MEMS mirror 10 enables highly versatile switching of light beams within the switch core 4.

Advantageously, the illustrated embodiment provides for the use of high fill factor optical arrays 6, in which at least the MEMS mirrors 10 are symmetrically arranged about the axis of symmetry 14 of the array 6. One of the optical bypasses 12 may conveniently be located on the axis of symmetry as shown in FIG. 1, although this is not essential to operation of the invention. The use of high fill-factor arrays 6 as shown in FIG. 1 enables a very compact switch core 4 which reduces aberration effects of the ATO lens 8. A planar design of each optical array 6 facilitates manufacture, while a linear arrangement of all components about an axis of symmetry 14 corresponding to the optical axis of the ATO lens 8 affords a very compact design of the cross-connect 2. A further factor in affording a compact cross-connect 2 is that small components can be used because of the beam geometry.

Each optical bypass 12 provides an unobstructed path through the respective optical array 6 (and bypassing the MEMS mirrors 10 of the array 6) to thereby enable light beams to enter (or exit) the switch core 4. This may be accomplished by providing an opening that defines a passage through which light beams may pass, as may be seen in FIG. 1. Alternatively, each optical bypass 12 may be provided as a region of the array structure that is substantially transparent to optical wavelengths of light beams being switched through the cross-connect 2. This latter arrangement can be readily provided by constructing each optical array 6 on a conventional Si and/or $SiO_2$ substrate, which is typically transparent to the wavelengths of interest. In this case, each optical bypass 12 can be readily constructed by providing a suitably sized region of the substrate that is un-obstructed by MEMS mirrors 10 and/or associated mirror control circuitry (not shown).

As shown in FIG. 1, each optical bypass 12 is associated with a respective fiber bundle 16 that includes N waveguides 18 symmetrically arranged about a respective axis of symmetry 20 of the fiber bundle 16. In the embodiment of FIG. 1, the axes of symmetry 20 of each of the fiber bundles 16 are substantially parallel, and axes of symmetry 20 of opposed pairs of fiber bundles 16 are substantially coextensive.

In the illustrated embodiment, each fiber bundle 16 comprises N=4 waveguides 18 arranged in a linear array (that is, lying in the plane of the page). It will be appreciated that each fiber bundle 16 may comprise fewer or more waveguides 18, and that the waveguides 18 may be arranged in a two-dimensional array, that is, with each waveguide 18 terminating in a plane extending substantially perpendicular to the page of the drawings. Within each fiber bundle 16, each waveguide 18 terminates in a respective optical port 22 which incorporates a collimating lens centered on the optical axis of the respective waveguide 18. The optical port 22 operates to guide a light beam propagating into the switch core 4 from the waveguide 18, and vis-a-versa.

Figure 2A:
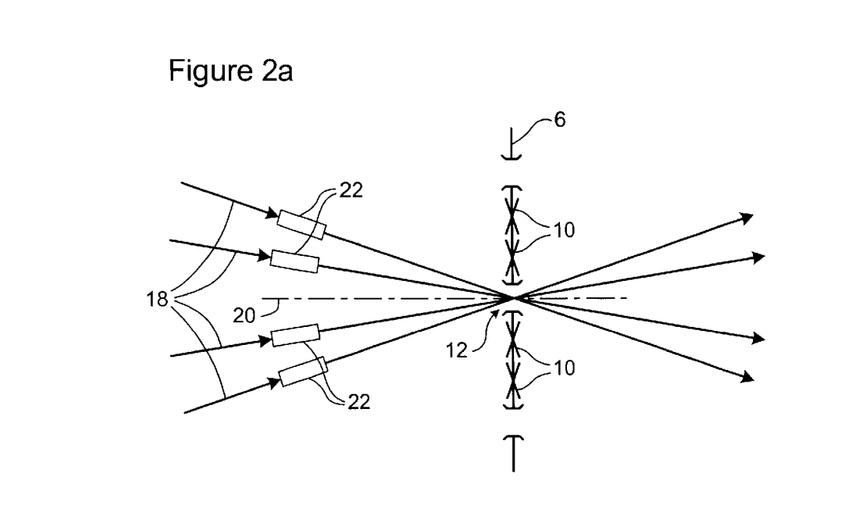
FIGS. 2a and 2b are block diagrams schematically illustrating alternative embodiments of the present invention.

As may be seen in FIG. 1, the propagation path of light beams entering and leaving the switch core 4 are caused to converge as they pass through an associated optical bypass 12. As shown in FIG. 1, this may be accomplished by means of a respective relay lens 24 disposed proximal each bypass 12, and having a focal point substantially coextensive with the bypass 12. Alternatively, the optical ports 22 of each bundle 16 may be arranged radially about a respective associated bypass 12, so that the respective optical axes of the ports 22 converge at the bypass 12, as shown in FIG. 2a.

Figure 2B:
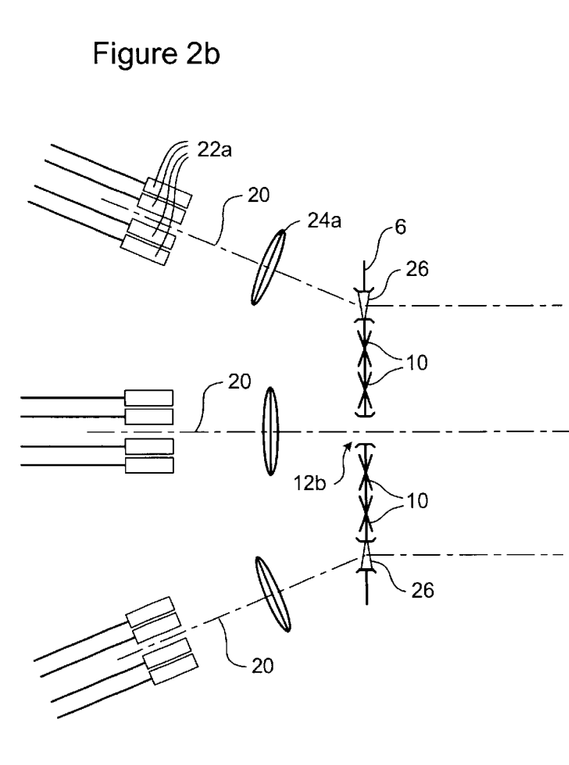

If desired, one or more optical bypasses 12 may be designed such that light beams are deflected as they pass through the optical bypass 12, as shown in FIG. 2b. This may be accomplished by providing the optical bypass 12 in question with a suitable optical device 26, such as, for example, a lens, mirror or prism. By means of this arrangement, light beams passing through the optical bypass 12 can be deflected, which allows the associated fiber bundle 16 to be located in an area of the cross-connect 2 in which there is sufficient space available to permit installation of the fiber bundle 16. This arrangement facilitates construction of a cross-connect 2 in which high fill factor optical arrays 6 are used to minimize the physical size of the switch core 4 while allowing fiber bundles 16 to be positioned within the cross-connect 2.

Figure 3A:
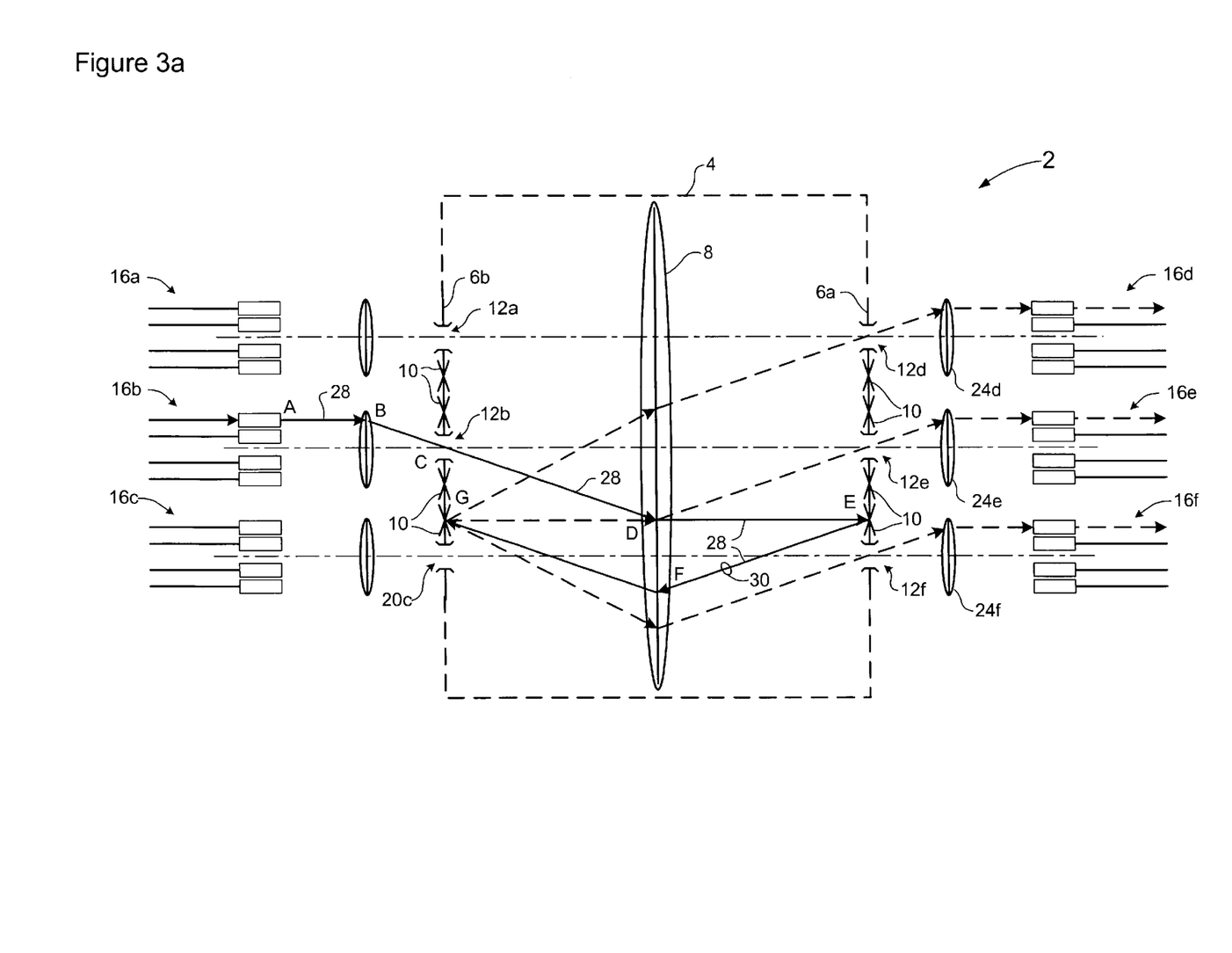
FIGS. 3a and 3b are ray-trace diagrams schematically illustrating optical switching in a cross connect in accordance with the embodiment of FIG. 1.

As may be seen in FIG. 3a, the mirrors 10 within each optical array 6 are arranged to lie in a propagation path of light beams entering the switch core 4 through each optical bypass 12 in the opposite array 6. As such, the number and arrangement of mirrors 10 in each array 6 will tend to follow the number and arrangement of waveguides 18 within each fiber bundle 16, and may, for example, follow a linear, orthogonal or a radial pattern about their respective axis of symmetry 20.

As is known in the art, light beams may propagate bi-directionally within each waveguide 18. Similarly, each fiber bundle 16 may carry bi-directional traffic, with beams propagating in one direction in some waveguides 18, and in the opposite direction in other waveguides 18 of the same fiber bundle 16. Furthermore, it will be seen that, due to the symmetry of the optical arrays 6 defining the switch core 4, light beams may enter the switch core 4 through any fiber bundle 16, and may exit the switch core 4 through any other fiber bundle 16. However, for the sake of simplicity of the following description, fiber bundle 16b will be considered to be an "input" bundle, in which light beams within all of the waveguides 18 are propagating into the optical cross-connect 2. The remaining fiber bundles 16a and 16c–16f are thus considered to be "output" bundles through which light beams may exit the optical cross-connect.

As mentioned above, a mirror 10 of one array 6 can be positioned to define a propagation path between any two optical elements 10,12 of the opposite array 6. In the present invention, this capability is employed to provide a folded path 3D switch core 4 in which the mirrors 10 of the optical arrays 6 can be positioned to switch incoming light beams into multiple express and switching optical paths.

Figure 3B:
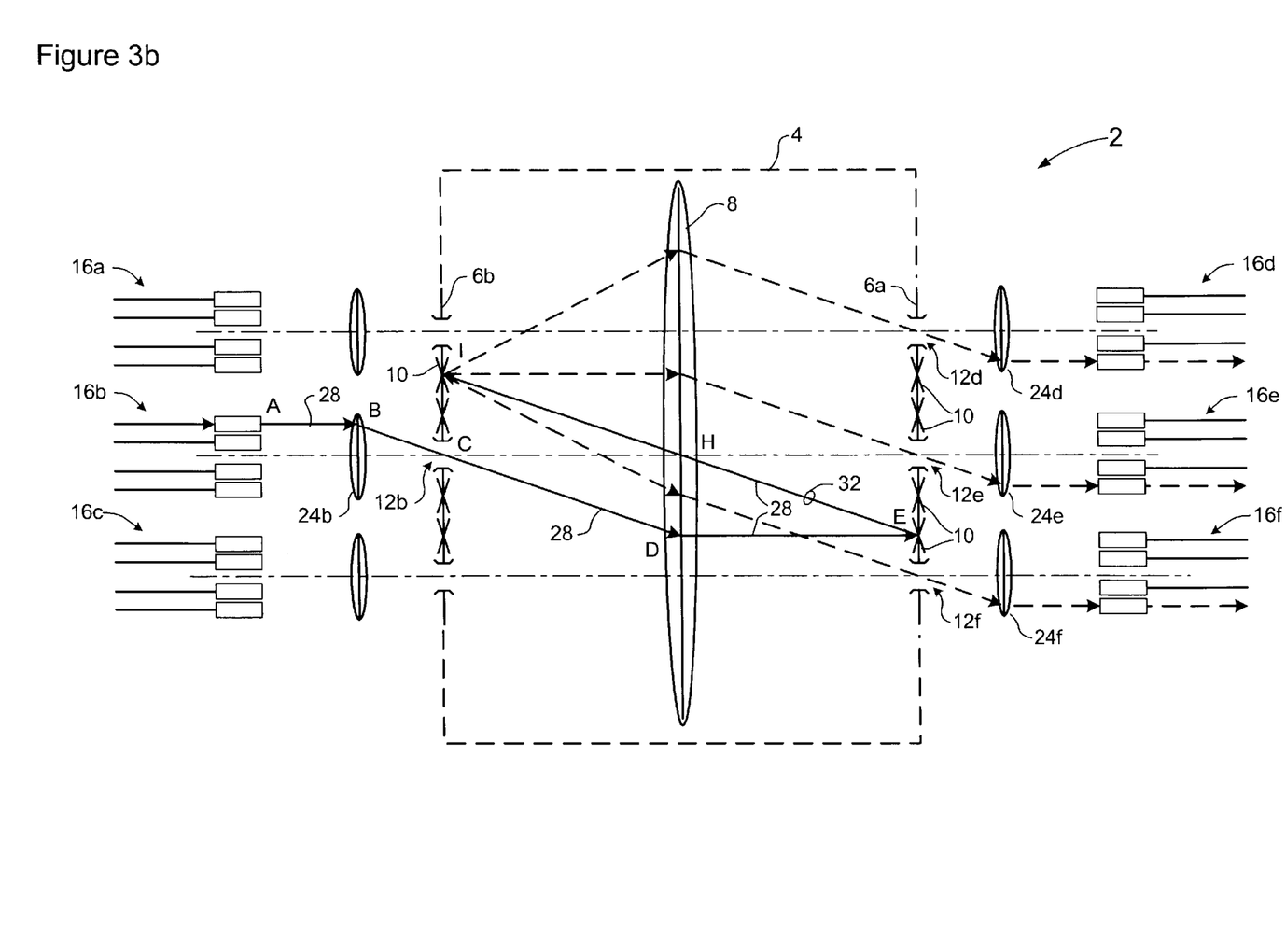

In general, a switching optical path is a propagation path in which a light beam received (by the involved mirror 10) from a bypass 12 is deflected to a mirror 10 of the opposite array 6, or vis-a versa. Thus in a switching optical path, a light beam traverses the switch core 4 with two reflections. Referring to FIGS. 1 and 3a–3b, it will be seen that light beams entering the switch core 4 through bypass 12b (i.e. from the input fiber bundle 16b) can follow switching paths to exit the switch core 4 through any of bypasses 12d–12f. Thus the associated fiber bundles 16d–16f may be referred to as switched output bundles.

Figure 4:
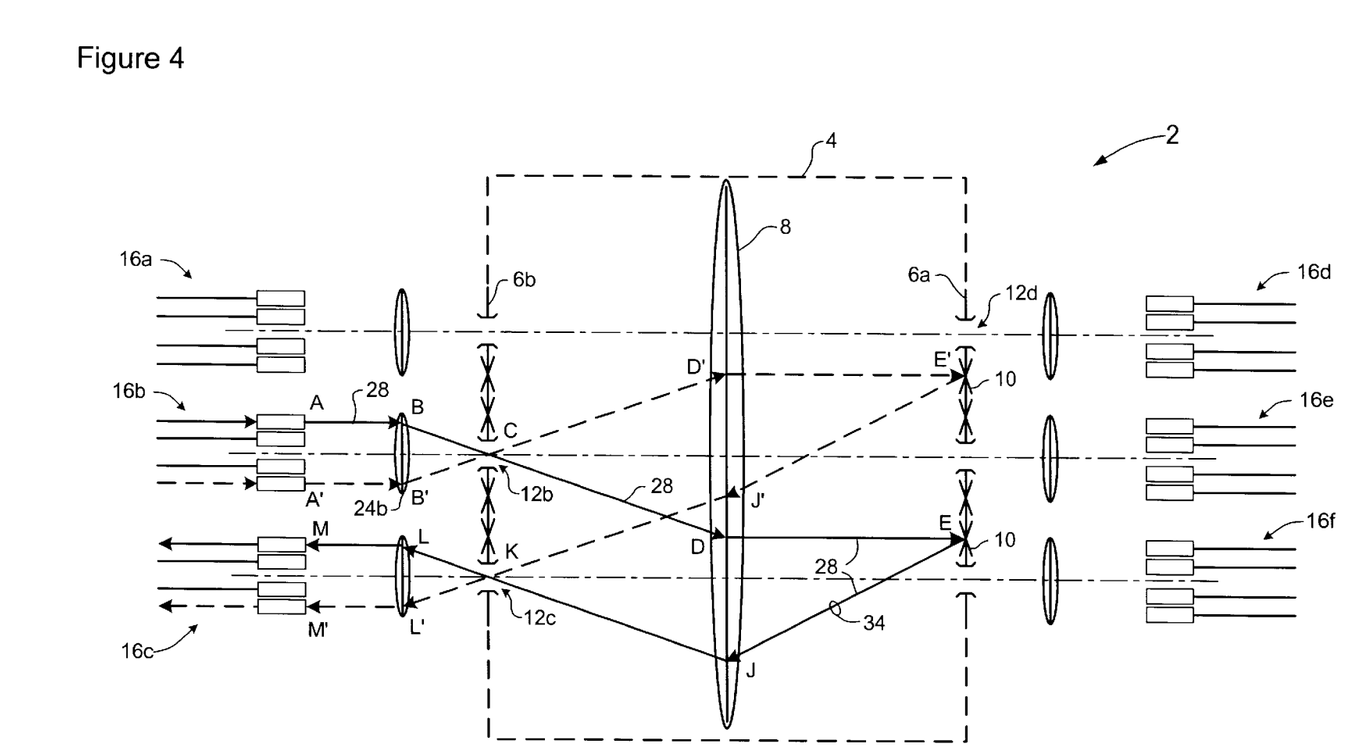
FIG. 4 is a ray-trace diagram schematically illustrating optical express paths in the embodiment of FIG. 1.

Conversely, an express optical path is a propagation path in which a light beam received (by the involved mirror 10) from one bypass 12, is deflected to another bypass 12, and thus traverses the switch core 4 with a single reflection. Referring to FIGS. 1 and 4, it will be seen that light beams entering the switch core 4 through bypass 12b (i.e. from the input fiber bundle 16b) can follow express paths to exit the switch core through either of bypasses 12a or 12c. Thus the associated fiber bundles 16a and 16c may be referred to as express output bundles.

FIGS. 3a and 3b illustrate operation of the invention to switch an input light beam to a selected output waveguide 18 using switching optical paths in accordance with the present invention. Referring now to FIG. 3a, an exemplary light beam 28 is received by the optical cross-connect 2 through a respective input waveguide 18 of the input fiber bundle 16b (at A), deflected by the relay lens 24b (at B), and enters the switch core 4 through the input optical bypass 12b (at C). As the input light beam 28 propagates through the switch core 4, it is deflected by the ATO lens 8 (at D), and made incident upon a first MEMS mirror 10a (at E) of optical array 6a. This mirror 10a is independently movable to enable the light beam 28 received from the input bypass 12b to be deflected to either a switching optical path or an express optical path. FIGS. 3a and 3b illustrate routing of the light beam 28 using two exemplary switching optical paths. FIG. 4 illustrates routing of the light beam 28 using an exemplary express optical path.

As described above, a switching optical path utilizes a second reflection to enable the light beam 28 to be switched to a selected output waveguide 18. Thus, in the illustration of FIG. 3a, the first MEMS mirror 10a (at E) is positioned to deflect the light beam 28 received from the input bypass 12b into a first exemplary switching optical path 30, within which the light beam 28 propagates through the ATO lens 8 (at F), to a second MEMS mirror 10b (at G) of the opposite optical array 6b. As may be seen in FIG. 3a, the second MEMS mirror 10b (at G) is associated with a predetermined set of output waveguides 18, to which the light beam 28 can be deflected by suitable positioning of the mirror 10b (at G). This set of output waveguides 18 is made up of one output waveguide 18 of each of switched output fiber bundles 16d–16f, so that the light beam 28 can be selectively switched from the second mirror 10b (at G) to a respective output waveguide 18 in any one of the switched output fiber bundles 16d–16f.

In the illustration of FIG. 3b, the first MEMS mirror 10a (at E) is positioned to deflect the light beam 28 received from the input bypass 12b into a second exemplary switching optical path 32, within which the light beam 28 propagates through the ATO lens 8 (at H), to a second MEMS mirror 10b' (at I) of the optical array 6b. This mirror 10b' (at I) is similarly associated with a predetermined set of output waveguides 18, consisting of one output waveguide 18 of each of the switched output fiber bundles 16d–16f, to which the light beam 28 can be switched from the second mirror 10b' (at I).

In general, each mirror 10 of optical array 6b can receive the light beam 28 from any mirror 10 of array 6a, and is associated with a unique set of output waveguides 18 consisting of one output waveguide 18 of each of the switched output fiber bundles 16d–16f. Thus it will be seen that the light beam 28 can be switched from the first MEMS mirror 10a (at E) to any output waveguide 18, in any of switched output fiber bundles 16d–16f, by deflecting the light beam from the first MEMS mirror 10a (at E) to a suitably selected one of the mirrors 10 of optical array 6b, and then suitably positioning the selected MEMS mirror 10 to deflect the light beam (received from the first MEMS mirror 10a (at E)) to the desired output waveguide 18. Thus light beams received through N input waveguides 18 (e.g. of the input fiber bundle 16b) can be switched, using suitable switched optical paths, to S×N output waveguides (e.g. of the switched output fiber bundles 16d–16f), where S is the number of switched output fiber bundles 16, and therefore the number of output waveguides 18 associated with each mirror 10 of the second optical array 6b (in the illustrated example, S=3). This switching functionality can be accomplished using a switch control system capable of placing each mirror 10 of the first optical array 6a in a selected one of N positions, and each mirror 10 of the second optical array 6b in a selected one of S×N positions.

FIG. 4 is a ray-trace diagram schematically illustrating operation of the invention to switch an input light beam to a selected express output fiber bundle 16c using express optical paths in accordance with the present invention. As described above and illustrated in FIG. 4, an express optical path involves directing the light beam from an input waveguide 18 to an output waveguide 18 using a single reflection. Thus, as shown in FIG. 4, an exemplary light beam 28 enters the switch core from an input waveguide 18b (at A), and propagates to the MEMS mirror 10a (at E) in the same manner as described above with respect to FIGS. 3a and 3b. However, in this case, the MEMS mirror 10a (at E) is positioned to reflect the light beam 28 into an express optical path 34, in which the light beam 28 propagates to an output waveguide 18 (at M) of express output fiber bundle 16c via the ATO lens 8 (at J), optical bypass 12c (at K), and relay lens 24c (at L), while bypassing the mirrors 10 of array 6b. A complementary express optical path A'–M' is followed by a second exemplary light beam propagating from another input waveguide 18 of the input fiber bundle 16b, and is received through a corresponding different one of the output waveguides 18 of express output fiber bundle 16c. It will be appreciated that light beams 28 entering the switch core from an input waveguide 18b (at A–A') can similarly be switched by the mirrors of array 6a (at E–E') into express optical paths in which the light beams 28 propagate to respective output waveguides 18 of express output fiber bundle 16a via the ATO lens 8.

In the illustrated embodiment, light beams received from the input fiber bundle 16b are deflected by the mirrors 10 of optical array 6a towards the same express output fiber bundle 16c. In the embodiment of FIGS. 1, 3a–3b and 4, this means that all of the mirrors 10 of optical array 6a are positioned to deflect respective received light beams in a common direction. The ATO lens 8 then deflects the light beams to converge as they pass through the optical bypass 12c (at K) so that they will be received by respective waveguides 18 of express output fiber bundle 16c. Because the mirrors 10 of optical array 6b are bypassed, re-ordering of the light beams among the waveguides 18 of the involved fiber bundles 16 is not performed. Instead, the output waveguide 18 that receives a light beam through an express optical path is determined by the design of the switch core 4.

In the illustrated embodiment, two express output fiber bundles are illustrated (fiber bundles 16a and 16c), so that the mirrors 10 of optical array 6a can be suitably positioned to deflect the light beams to a selected one of the express output fiber bundles 16a, 16c via corresponding express optical paths. This functionality is accomplished by controlling the mirrors 10 of optical array 6a to place each involved mirror 10 into a corresponding express position for each express optical path. Preferably, the mirrors 10 are designed to have a hard stop, enabling the mirrors to be rapidly and reliably positioned in at least one express position. Still more preferably, such a latching operation can be provided as a "default" position, so that in the event of a failure of the cross-connect (e.g. a power failure), the mirrors 10 will automatically adopt an express position, so that, for example, light beams received by the cross-connect 2 after the failure can be automatically re-directed to a back-up switch block.

Figure 5:
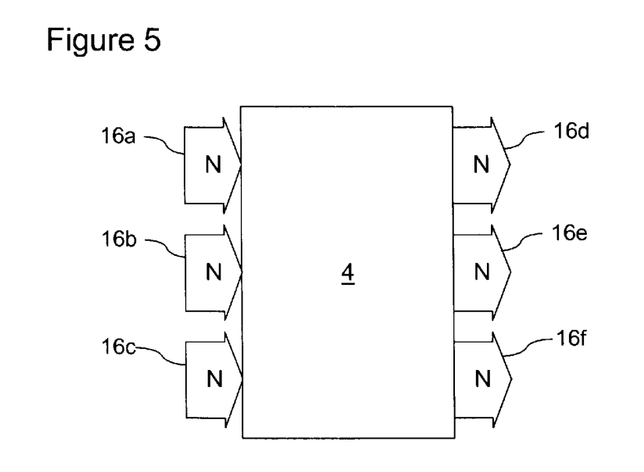
FIG. 5 is a block diagram schematically illustrating operation of a second embodiment of the present invention.

In the embodiment described above with reference to FIGS. 1–4, a single fiber bundle 16b is considered to be an input bundle, while fiber bundles 16a and 16c are express output bundles, and fiber bundles 16d–f are switched output bundles. However, it will be appreciated that any of the fiber bundles may be used to conduct incoming traffic into the switch core 4, and that the incoming traffic may be distributed across two or more input fiber bundles 16. FIG. 5 is a block diagram schematically illustrating operation of an embodiment of the present invention, in which fiber bundles 16a–16c are used as input bundles, while fiber bundles 16d–16f are used as output bundles. This arrangement may be described as a sub-equipped 3N×3N cross-connect, in which light beams being carried in any N of the 3N input waveguides 18a–18c can be switched by the switch core 4 to any N of the 3N output waveguides 18d–18f.

Figure 6:
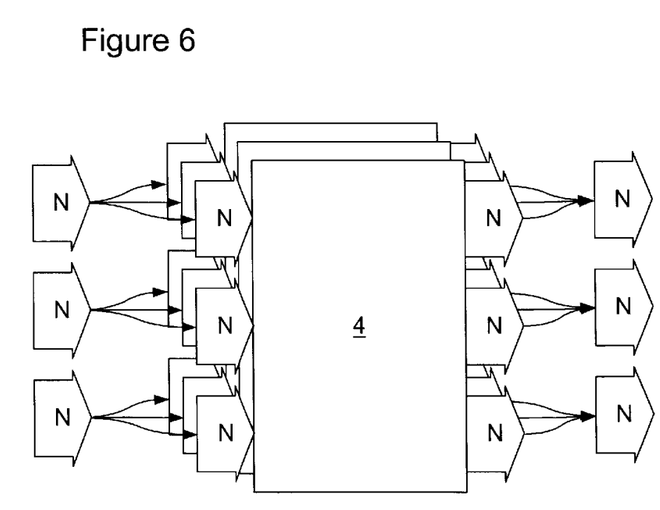
FIG. 6 is a block diagram schematically illustrating operation of a fully non-blocking 3N×3N switch using the embodiment of FIG. 5.

As shown in FIG. 6, sub-equipped 3N×3N cross-connects of FIG. 5 can be coupled in parallel to create a fully non-blocking 3N×3N switch architecture, in which a light beam in any one of the 3N inputs can be switched through to any one of 3N outputs. In this case, the 3N inputs are selectively coupled (e.g. by an optical router, not shown) to respective input waveguides 18a–c of each one of the three sub-equipped 3N×3N cross-connects. Each of the sub-equipped 3N×3N cross-connects then operates independently to switch light beams in a respective N of their 3N input waveguides 18a–c to N of their 3N output waveguides 18d–f. Corresponding output waveguides 18d–f of each of the three sub-equipped 3N×3N cross-connects are then coupled to a respective output, through which a switched light beam is conducted away from the switch.

Thus it will be seen that the present invention provides a high capacity cross-connect in which a 3D switch core includes express paths that facilitate cascading of cross-connect blocks. A light beam propagates from an input waveguide 18 to a first MEMS mirror 10, which deflects the light beam to either an express optical path or a switching optical path. In the express optical path, the light beam propagates from the first MEMS mirror 10 to a predetermined output waveguide, which is determined by the design of the switch core. In the switching optical path, the light beam propagates from the first MEMS mirror 10 to a second MEMS mirror 10, which deflects the light beam to a selected one of a set of two or more output waveguides associated with the second MEMS mirror 10.

The embodiments of the invention described above are intended to be exemplary only. The scope of the invention is therefore intended to be limited solely by the scope of the appended claims.

We claim:

1. A cascadable optical cross-connect for redirecting a light beam between one of a plurality of input ports and one of a plurality of output ports or one of a plurality of express ports comprising:

first and second opposed optical arrays, each optical array including a plurality of mirrors for redirecting the light beam; and a first optical bypass disposed in the first optical array enabling the light beam to pass through the first optical array between one of the input ports and one of the mirrors in the second optical array;

a second optical bypass disposed in the first optical array enabling the light beam to pass through the first optical array between one of the mirrors of the second optical array and one of the express ports;

a third optical bypass disposed within the second optical array enabling the light beam to pass from one of the mirrors of the second optical array through the first optical array to one of the express ports;

a third optical bypass disposed within the second optical array enabling the light beam to pass from one of the mirrors of the second optical array to one of the mirrors of the first optical array, which directs the light beam through the second optical array to one of the output ports;

wherein the mirrors are moveable to selectively define a propagation path of a light beam between the first optical bypass and the second or third optical bypasses one of the output ports and one of the mirrors of the first optical array;

wherein the mirrors are moveable to selectively define a propagation path of a light beam between any two optical bypasses.

2. An optical cross-connect as claimed in claim 1, wherein each optical bypass comprises any one of:

an optically transparent region of the respective optical array; and an opening defining a passage through the respective optical array.

3. An optical cross-connect as claimed in claim 2, wherein each optical bypass further comprises means for deflecting light beams propagating through the optical bypass.

4. An optical cross-connect as claimed in claim 3, wherein the deflecting means comprises any one or more of: a lens; a prism; and a mirror.

5. An optical cross-connect as claimed in claim 1, further comprising a fourth optical bypass disposed in the second optical array enabling the light beam to pass through the second optical array between one of the mirrors in the first optical array and one of output ports.

6. An optical cross-connect as claimed in claim 1, wherein the first optical bypass comprises means for directing each light beam from the input ports to converge within the first optical bypass.

7. An optical cross-connect as claimed in claim 6, wherein the means for directing each light beam comprises either one of:

a relay lens disposed between the first optical bypass and the input ports, the relay lens having a focal point disposed within the first optical bypass; and a radial orientation of the input ports about the first optical bypass.

8. An optical cross-connect as claimed in claim 1, wherein each mirror in the second array is associated with one of the input ports.

9. An optical cross-connect as claimed in claim 1, wherein each mirror in the second optical moves to a selected one express position for directing the light beams through the second optical bypass in an event of a failure of the optical cross-connect.

10. An optical cross-connect as claimed in claim 1, further comprising a controller:

control the position of a first mirror of the second optical array to deflect an incident light beam received from an input port to a selected second mirror of the first optical array; and control the position of the second mirror to deflect the light beam received from the first mirror to a selected output port.

11. An optical cross-connect as claimed in claim 10, wherein the second mirror is selected based on the desired output port, and the position of the second mirror based on the optical bypass, behind which the desired output port is located.

12. An optical cross-connect as claimed in claim 1, wherein each optical array further comprises an axis of symmetry, at least the respective plurality of mirrors being symmetrically disposed about the axis of symmetry.

13. An optical cross-connect as claimed in claim 12, wherein one of the optical bypasses disposed within each optical array is disposed on the respective axis of symmetry of the optical array.

14. An optical cross-connect as claimed in claim 12, wherein the axes of symmetry of each of the optical arrays are co-extensive.

15. An optical cross-connect as claimed in claim 1, further comprising a lens disposed between the first and second opposed optical arrays.

16. An optical cross-connect as claimed in claim 15, wherein the first and second opposed optical arrays are oriented to lie in respective opposed focal planes of the lens.

17. An optical cross-connect as claimed in claim 15, wherein at least one optical bypass disposed within each optical array is disposed on an optical axis of the lens.

18. An optical cross-connect as claimed in claim 17, wherein the respective plurality of mirrors of each optical array are symmetrically disposed about an optical axis of the lens.

19. An optical switch for selectively switching a light beam between an input port and one of a plurality of output ports, the optical switch comprising:

a first input port for launching a first light beam into the optical switch:

an cascadable optical cross-connect comprising:

first and second opposed optical arrays, each optical array including a plurality of mirrors; and a first optical bypass disposed within the first optical array enabling the first light beam to pass through the first optical array between the first input port and a respective mirror of the second optical array, whereby the mirror of the second optical array redirects the first light beam to one of the mirrors in the first optical array;

a second optical bypass disposed within the second optical array enabling the first light beam, which has been redirected by mirrors from the first and second optical arrays, to pass through the second optical array;

a third optical bypass disposed within the second optical array enabling the first light beam, which has been redirected by mirrors from the first and second optical arrays, to pass through the second optical array;

a first set of output ports, proximate the second optical bypass, for outputting the first light beam, which has been redirected by mirrors from the first and second optical arrays;

a second set of output ports, proximate the third optical bypass, for outputting the first light beam, which has been redirected by mirrors from the first and second optical arrays;

a controller adapted to control a respective position of each mirror to selectively define a propagation path of the first light beam between the first and the second or third optical bypasses.

20. The optical switch according to claim 19, further comprising:

a second input port for launching a second light beam through the first optical bypass at one of the mirrors in the second optical array, whereby the mirror in the second optical array redirects the second light beam towards one of the mirrors in the first optical array; and wherein one of the mirrors in the first optical array directs the second light beam through the second or the third optical bypass to one of the second or third set of output ports, respectively.

21. An optical cross-connect switch comprising:

a first input port for launching a first beam of light;

a switch core including:
   a first optical bypass on a first side of the switch core for passing the first beam of light into the switch core;
   a first adjustable mirror on a second side of the switch core, opposite to the first side, for redirecting the first beam of light along one of a first set of paths;
   an array of reflectors on the first side of the switch core, each reflector disposed in one of the first set of paths, for redirecting the first beam of light to one of a second set of paths;
   a second optical bypass on the first side of the switch core disposed in one of the first set of paths for passing the first beam of light out of the first side of the switch core; and
   a third optical bypass on the second side of the switch core at a point of convergence of the second set of paths for passing the first beam of light out of the second side of the switch core;

a first set of output ports adjacent the second side of the switch core for receiving the first beam of light from the third optical bypass; and a second set of output ports adjacent the first side of the switch core for receiving the first beam of light from the second optical bypass.

22. The switch according to claim 21, further comprising:

a second input port for launching a second beam of light through the first bypass; and a second adjustable mirror on the second side of the switch core for redirecting the second beam of light to one of a third set of paths;

wherein each reflector is disposed in one of the third set of paths, for redirecting the second beam of light to one of the first set of output ports via one of the second set of paths; and wherein the second bypass is disposed in one of the third set of paths for passing the second beam of light to one of the third set of output ports.

23. The switch according to claim 22, further comprising:

a fourth optical bypass in the second side of the switch core for passing the first or the second beam of light out of the switch core; and a third set of output ports adjacent the second side of the switch core for receiving the first or the second beam of light from the fourth optical bypass;

wherein the array of reflectors is also for redirecting the first or the second beam of light to one of a fourth set of paths converging at the fourth optical bypass.

24. The switch according to claim 23, further comprising a lens between the first and second mirrors and the array of reflectors for redirecting the beams of light traveling therebetween.

* * * * *

UNITED STATES PATENT AND TRADEMARK OFFICE
CERTIFICATE OF CORRECTION

PATENT NO.    : 6,618,517 B2
DATED         : September 9, 2003
INVENTOR(S)   : Ducellier et al.

It is certified that error appears in the above-identified patent and that said Letters Patent is hereby corrected as shown below:

Column 10,
Line 63, cancel all beginning with "through the first optical array…" to and including "a propagation path of a light beam between any two optical bypasses.", and insert the following:
-- from one of the mirrors of the second optical array through the first optical array to one of the express ports;
a third optical bypass disposed within the second optical array enabling the light beam to pass from one of the mirrors of the second optical array to one of the mirrors of the first optical array, which directs the light beam through the second optical array to one of the output ports;
wherein the mirrors are moveable to selectively define a propagation path of a light beam between the first optical bypass and the second or third optical bypasses. --

Column 11,
Line 50, "second optical moves" should read -- second optical array moves --
Line 55, "comprising a controller:" should read -- comprising a controller to: --

Signed and Sealed this

Eleventh Day of May, 2004

JON W. DUDAS
*Acting Director of the United States Patent and Trademark Office*